United States Patent [19]

Yankell

[11] 3,914,406

[45] Oct. 21, 1975

[54] COMPOSITIONS AND METHOD FOR PREVENTION AND TREATMENT OF GINGIVITIS

[75] Inventor: Samuel L. Yankell, Moorestown, N.J.

[73] Assignee: Menley & James Laboratories, Ltd., Philadelphia, Pa.

[22] Filed: Dec. 28, 1973

[21] Appl. No.: 429,433

[52] U.S. Cl. .................................................. 424/52
[51] Int. Cl.² ......................................... A61K 7/18
[58] Field of Search ............................... 424/49–58, 424/52

[56] References Cited
UNITED STATES PATENTS
3,083,143   3/1963   Schmid et al. ........................ 424/52

OTHER PUBLICATIONS

Bay et al., J. Periodont. Res. Vol. 3, pp. 103–108, 1968.

Moore et al., J. Dental Res., Vol. 43, pp. 782 & 783, 1964.

*Primary Examiner*—Richard L. Huff
*Attorney, Agent, or Firm*—Joseph A. Marlino; Richard D. Foggio; William H. Edgerton

[57] ABSTRACT

Dentifrice compositions for preventing and treating gingivitis containing amine fluorides and a method of preventing and treating gingivitis by administering the compositions to the oral cavity of animal organisms.

10 Claims, No Drawings

COMPOSITIONS AND METHOD FOR PREVENTION AND TREATMENT OF GINGIVITIS

This invention relates to dentifrice compositions and a novel method of preventing and treating gingivitis by administering these compositions. More specifically, this invention relates to a method of preventing and treating gingivitis by employing dentifrice compositions containing amine hydrofluorides.

Gingivitis is the most common precursor of periodontal disease. Gingivitis is defined as a reddening and swelling of the normally pink gums and may be accompanied by occasional bleeding. If ignored, this inflammation progresses and the gums could ulcerate and in the final stage the supporting fibers and the bone which anchors the teeth are destroyed with eventual loss of the teeth.

Prior to the present invention, in the field of oral and dental hygiene, a large variety of amine fluoride preparations have been employed as cleansing and/or hygienic agents for the oral cavity, specifically for use in caries prophylaxis. These preparations are disclosed in U.S. Pat. Nos. 3,083,143, 3,124,512, and 3,277,118. Some typical examples include toothpastes, dental creams, tooth powders, mouth rinses, lozenges, tablets, aerosol sprays, chewing gums, and the like. However, there has been no report regarding the anti-gingivitis properties of these dental preparations. The problem of providing an effective agent which will inhibit and treat gingivitis is well recognized by the dental profession.

It is therefore an object of this invention to provide effective, nontoxic dentifrice compositions and a method for preventing and treating gingivitis employing these compositions.

The compositions and method of this invention are unique for the treatment of gingivitis. Such activity has never been reported for the compounds described hereinafter. More specifically, the dentifrice compositions of this invention comprise amine hydrofluorides or combinations thereof having the following formula:

RXHF in which:

FORMULA 1

R represents alkyl or alkenyl groups having from about 10 to about 24 carbon atoms, advantageously from 14 to 21 carbon atoms;

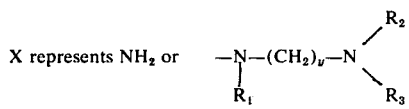

X represents NH$_2$ or $-\underset{R_1}{N}-(CH_2)_y-N\underset{R_3}{\overset{R_2}{\diagdown}}$ in which $y$ is an integer of from 1 to 3, and $R_1$, $R_2$ and $R_3$ represents hydrogen; lower alkyl, lower alkenyl or lower alkanol having up to 5 carbon atoms.

Exemplary of compositions of this invention are those which comprise the hydrofluoride salts of decylamine, dodecylamine, dodecenylamine, tetradecylamine, tetradecenylamine, pentadecylamine, hexadecylamine, hexadecenylamine, octadecylamine, octadecenylamine, eicosylamine, tetracosylamine, and N-[Bis-(hydroxyethyl)-aminopropyl]-N-(hydroxyethyl) alkylamine wherein the alkylamine is a mixture of alkylamine groups containing from about 12 to about 18 carbon atoms.

Advantageous compositions of this invention are those which comprise 9-octadecenylamine hydrofluoride, hexadecylamine hydrofluoride or N-[Bis-(hydroxyethyl)-aminopropyl]-N-(hydroxyethyl)octadecylamine dihydrofluoride.

The amine hydrofluorides of this invention are prepared by methods well known to the art. One such method is disclosed in U.S. Pat. No. 3,083,143 and comprises reacting the base in a suitable solvent such as methanol with aqueous hydrofluoric acid or gaseous hydrogen fluoride.

A mixture of preferred compounds of this invention, N-[Bis-(hydroxyethyl)-aminopropyl]-N-(hydroxyethyl) octadecylamine, dihydrofluoride and hexadecylamine hydrofluoride was tested in the clinic treating subjects suffering from gingivitis. These clinical tests were conducted as follows:

Forty-five subjects were selected from college age volunteers who were suffering from gingivitis. All subjects were given oral prophylaxis and were rank ordered and assigned at random to one of three groups, Group 1 experimental dentifrice, Group II placebo dentifrice, and Group III coded commercial dentifrice containing an inorganic fluoride. Immediately following prophylaxis, all subjects brushed their teeth with the assigned dentifrice. The subjects returned for the second brushing that evening. All subjects discontinued other oral hygiene procedures except brushing for 2 minutes, twice daily, for seven successive days under supervision, using the assigned coded dentifrice and toothbrush. The subjects refrained from intake of food, candy, beverages and smoking for at least ½hour after each treatment. On the morning of the eighth day the subjects reported to the clinic before breakfast for examination and refrained from eating or smoking until after the examination was completed. The examination for gingivitis included all labial, lingual gingival margins and papillae and employed the following scale for severity:

0 — clinically normal — pink color, no edema alteration in contour

1 — slight inflammation — red color, edema and/or altered contour

2 — moderate inflammation — deep red color, definite edema and altered contour

3 — severe inflammation — dark red blue color, severe edema and altered contour

Table 1 represents the results of this clinical study. The gingivitis scores were analyzed by covariance.

Table 1

| Dentifrice Toothpaste | Total Gingivitis Score Averages | | |
|---|---|---|---|
| | Initial Score | Post-Brushing Scores Raw | Adjusted |
| MJ-148* | 40.3 | 26.1 | 23.6 |
| Commercial | 33.6 | 29.4 | 31.3 |
| Placebo | 35.6 | 30.0 | 30.6 |

*A mixture of N-[Bis-(hydroxyethyl)-aminopropyl]-N-(hydroxyethyl)octadecylamine dihydrofluoride and hexadecylamine in a 4:1 ratio in a toothpaste base.

The above results indicate that there is no measurable difference between the commercial toothpaste containing an inorganic fluoride and placebo. However, the post-brushing average scores of MJ-148, a dentifrice containing a combination of compounds of this invention, is significantly different (P <.05) from the commercial product and the placebo. In addition, careful visual examination indicated no irritation or toxic effects occurred in the oral tissues of the subjects.

The amine hydrofluorides of Formula 1 will be present in a nontoxic carrier suitable for use in the oral cavity. A wide variety of dentifrice forms can be employed. Advantageously the compositions of this invention will take the form of dentifrices such as, for example, toothpaste, mouth rinse, tooth powder, lozenge, aerosol spray, dental cream or chewing gum. The amine hydrofluorides will be present in an amount sufficient to retard and treat gingivitis. Preferably the composition will contain amine fluorides in an amount of from about 0.1 percent to about 10.0 percent, most advantageously from about 0.5 percent to about 5.0 percent by weight.

It will be evident to one skilled in the pharmaceutical art when preparing the above noted oral dentifrices that carriers suitable for the oral cavity such as, for example, sudsing agents, flavoring agents, abrasive polishing compounds, humectants and sweetening agents are standard pharmaceutical tools used in these preparations and are not an essential aspect of this invention. Therefore, the amount of these additive materials used can be varied.

Any suitable water insoluble polishing agent can be employed in the compositions of this invention, such as, for example, dicalcium phosphate, aluminum hydroxide, calcium carbonate, calcium polymetaphosphate, dicalcium orthophosphate dihydrate, sodium polymetaphosphate and mixtures thereof.

If a thickening agent is required, cellulose derivatives such as, for example, sodium carboxymethylcellulose and sodium carboxymethylhydroxyethyl cellulose or natural gums such as gum arabic or gum tragacanth may be employed.

Exemplary of sudsing agents which may be employed are, for example, sodium lauryl sulfate, sodium N-lauroyl sarcosinate, sulfonated monoglycerides of fatty acids having from 10 to 18 carbon atoms such as, for example, sodium monoglyceride sulfonates or mixtures thereof.

Among the specific compounds which may be employed as humectants are sorbitol, glycerine, polyhydric alcohols of like nature or mixtures thereof.

As examples of compounds that may be used as flavoring agents are peppermint oil, spearmint oil, wintergreen oil, sassafras oil and anise oil. Sweetening agents would include compounds such as, for example, saccharin, dextrose, and sodium cyclamate.

The method in accordance with this invention, to treat gingivitis or to induce an anti-gingivitis effect, comprises administering to the oral cavity of an animal organism, preferably humans, suffering from gingivitis, an amount sufficient to retard and treat said gingivitis the amine fluorides of Formula 1 combined with a nontoxic carrier suitable for use in the oral cavity. Preferably the amine fluorides will be present in dentifrice compositions in an amount of from about 0.1 percent to about 10.0 percent, most advantageously from 0.5 percent to about 5.0 percent. The administration of the compositions is to the oral cavity of animals, preferably humans, suffering from gingivitis formation and will be administered one to four times daily.

When the method of administration described above is carried out, gingivitis is effectively reduced or eliminated without any irritating or toxic effects to the oral tissue.

The invention will be further clarified by the following specific examples. These examples are not limiting but are used to make obvious to one skilled in the art the full practice of this invention.

EXAMPLE 1

| Mouth Rinse Ingredients | Amounts |
| --- | --- |
| 9-Octadecenylamine Hydrofluoride | 1.00% |
| 95% Ethanol, U.S.P. | 10.00% |
| Tween 80 | 1.00% |
| Flavors | 0.29% |
| Sorbitol Solution | 20.00% |
| Glycerin | 5.00% |
| Sodium Borate | 0.10% |
| Distilled Water, U.S.P., q.s. | 100.00% |

The 9-octadecenylamine hydrofluoride, tween and flavors are mixed with the ethanol. The sodium borate is dissolved in water and this mixture along with the sorbitol and glycerin are slowly added to the alcoholic solution with constant agitation.

Rinse oral cavity three times a day.

EXAMPLE 2

| Toothpaste Ingredients | Amounts |
| --- | --- |
| Hexadecylamine Hydrofluoride | 3.50% |
| Dicalcium Phosphate, very fine powder | 50.00% |
| Sodium Lauryl Sulfate | 2.50% |
| Flavors | 0.30% |
| Sodium Saccharin Solution, 50% | 0.10% |
| Methyl Paraben | 0.10% |
| Propylene Glycol | 18.00% |
| Glycerin | 1.00% |
| Carboxymethylcellulose | 0.90% |
| Purified Water, U.S.P., q.s. | 100.00% |

The carboxymethylcellulose is slowly added to water and mixed. The flavors and methyl paraben are mixed with the propylene glycol and glycerin and added to the above mixture along with the sodium saccharin solution. The hexadecylamine hydrofluoride is dissolved in water and added to the mixture with agitation. The dicalcium phosphate and sodium lauryl sulfate are added with constant stirring.

Apply the toothpaste to the oral cavity two times a day.

EXAMPLE 3

| Tooth Powder Ingredients | Amounts |
| --- | --- |
| N-[Bis-(hydroxyethyl)-aminopropyl]-N-(hydroxyethyl)alkylamine dihydrofluoride | 5.00 gms. |
| Precipitated Calcium Carbonate | 93.00 gms. |
| Saccharin Sodium | 1.00 gms. |
| Peppermint Oil | 0.50 ml. |
| Methyl Salicylate | 0.50 ml. |

The above ingredients are thoroughly mixed to form a tooth powder.

Brush the teeth with the powder twice a day.

EXAMPLE 4

| Mouthwash Ingredients | Amounts |
| --- | --- |
| 9-Octadecenylamine Hydrofluoride | 0.3% |
| Hexadecylamine Hydrofluoride | 0.1% |
| Alcohol, U.S.P. | 10.00% |
| Flavors | .633% |
| Sorbitol Solution, U.S.P. | 20.00% |
| Glycerin, U.S.P. | 5.00% |
| Sodium Benzoate, U.S.P. | 0.10% |
| Purified Water, U.S.P., q.s. | 100.00% |

The hydrofluorides, menthol, wintergreen oil, camphor, eucalyptol and anise oil are mixed with the alcohol. The sodium benzoate is dissolved in water and this mixture along with the sorbitol and glycerin are slowly added to the alcoholic solution with constant agitation.

The oral cavity is rinsed four times a day with the mouthwash.

EXAMPLE 5

| Toothpaste Ingredients | Amounts |
| --- | --- |
| N-[Bis-(hydroxyethyl)-aminopropyl]-N-(hydroxyethyl)alkylamine* dihydrofluoride | 1.75% |
| Hexadecylamine Hydrofluoride | 1.00% |
| Hydroxyethylcellulose | 1.50% |
| Sorbitol Solution, U.S.P. | 12.00% |
| Titanium Dioxide, U.S.P. | 1.75% |
| Sodium Metaphosphate, Insoluble | 20.00% |
| Flavor | 0.75% |
| Water, Purified, U.S.P., q.s. | 100.00% |

*A mixture of alkyl groups of the general formula $C_{14}$ to $C_{18}$.

The hydroxyethylcellulose is slowly added to water and mixed. The sorbitol solution is then added with thorough mixing. The titanium dioxide and insoluble sodium metaphosphate are added in portions with constant agitation until homogeneously mixed. A solution of the hydrofluorides is prepared by dissolving them in a portion of the water with the aid of heat. This solution is then added to the paste and mixed until evenly blended. The flavor is then added and the final product is stirred.

Brush the teeth with the paste three times a day.

What is claimed is:

1. The method of treating gingivitis which comprises administering to the oral cavity of an animal organism suffering from gingivitis a nontoxic amount sufficient to treat said gingivitis of a dentifrice composition comprising an amine hydrofluoride or combinations thereof having the formula:

RXHF in which:

R is alkyl or alkenyl having from about 10 to about 24 carbon atoms;

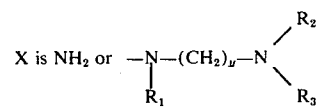

$$X \text{ is } NH_2 \text{ or } -\underset{R_1}{N}-(CH_2)_y-N\begin{matrix}R_2\\R_3\end{matrix}$$

in which y is an integer of from 1 to 3 and $R_1$, $R_2$ and $R_3$ represents hydrogen, lower alkyl, lower alkenyl or lower alkanol having up to five carbon atoms.

2. The method of claim 1 wherein the amine hydrofluoride is present in the dentifrice composition in an amount of from about 0.5percent to about 5.0 percent.

3. The method of claim 1 in which the composition is administered from one to four times daily.

4. The method of claim 1 wherein the dentifrice composition is a toothpaste.

5. The method of claim 1 wherein the dentifrice composition is a tooth powder.

6. the method of claim 1 wherein the dentifrice composition is a mouth rinse.

7. The method of claim 1 wherein the amine hydrofluoride is N-[Bis-(hydroxyethyl)-aminopropyl]-N-(hydroxyethyl) alkylamine, hexadecylamine, 9-octadecenylamine or combinations thereof.

8. The method of claim 2 wherein the amine hydrofluoride is a mixture of N-[Bis-(hydroxyethyl)-aminopropyl]-N-(hydroxyethyl)octadecylamine and hexadecylamine.

9. The method of claim 7 wherein the amine hydrofluoride is a mixture of 9-octadecylamine and hexadecylamine.

10. The method of claim 7 wherein the amine hydrofluoride is present in the dentifrice composition in an amount of from about 0.5percent to about 5.0percent.

* * * * *